Oct. 18, 1932.  H. H. HAGLUND  1,882,817
TELEGRAPH CARRIER SYSTEM
Filed June 28, 1930  2 Sheets-Sheet 1
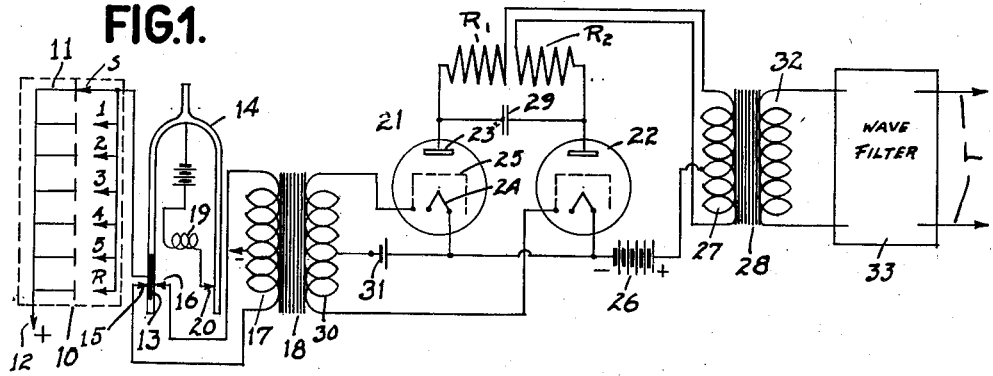
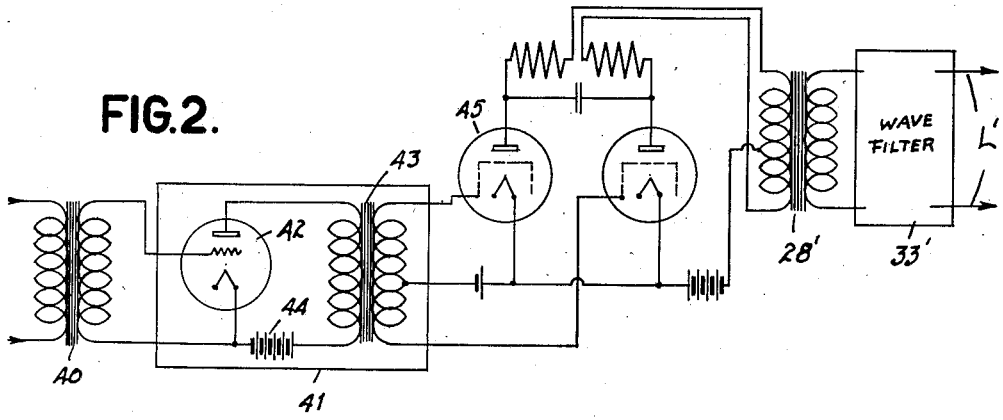
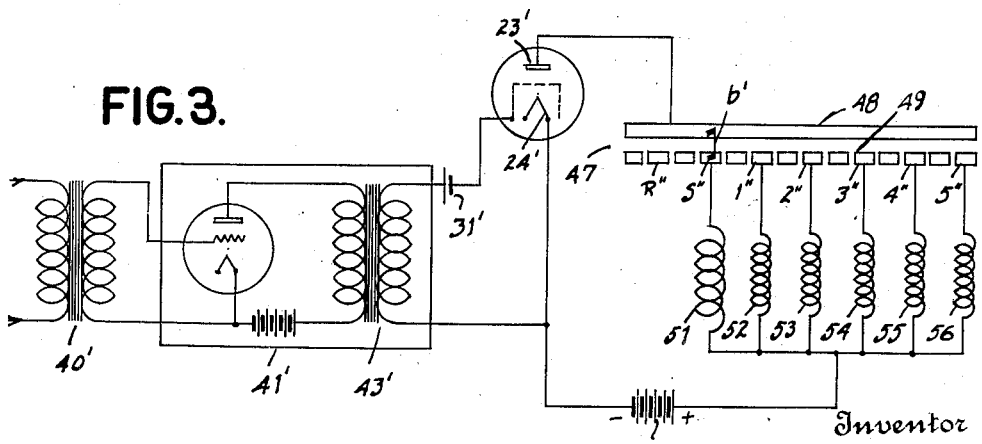
Inventor
HAKON H. HAGLUND
By his Attorney
Eugene C. Brown Oct. 18, 1932. H. H. HAGLUND 1,882,817
TELEGRAPH CARRIER SYSTEM
Filed June 28, 1930 2 Sheets-Sheet 2
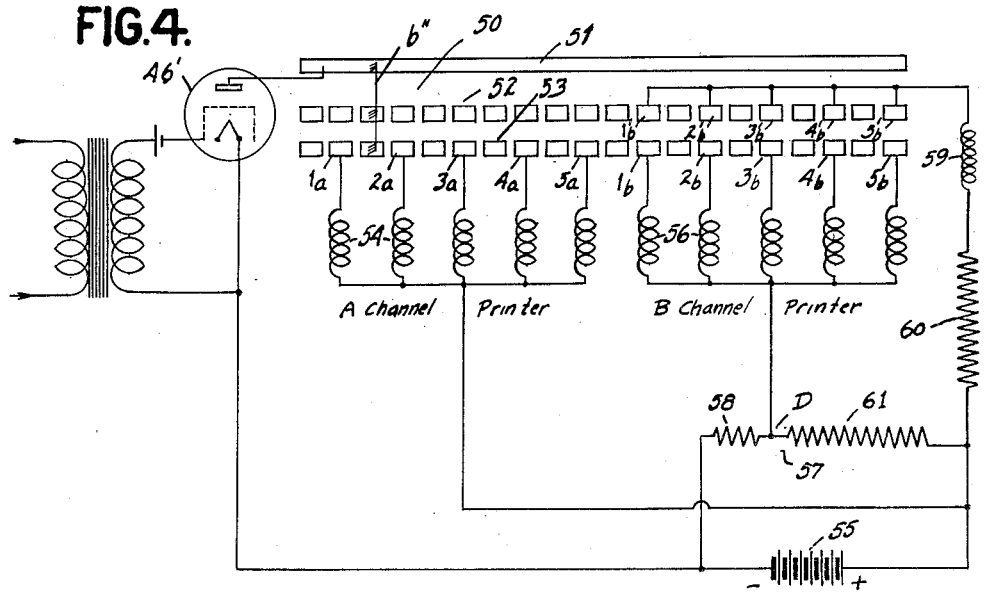
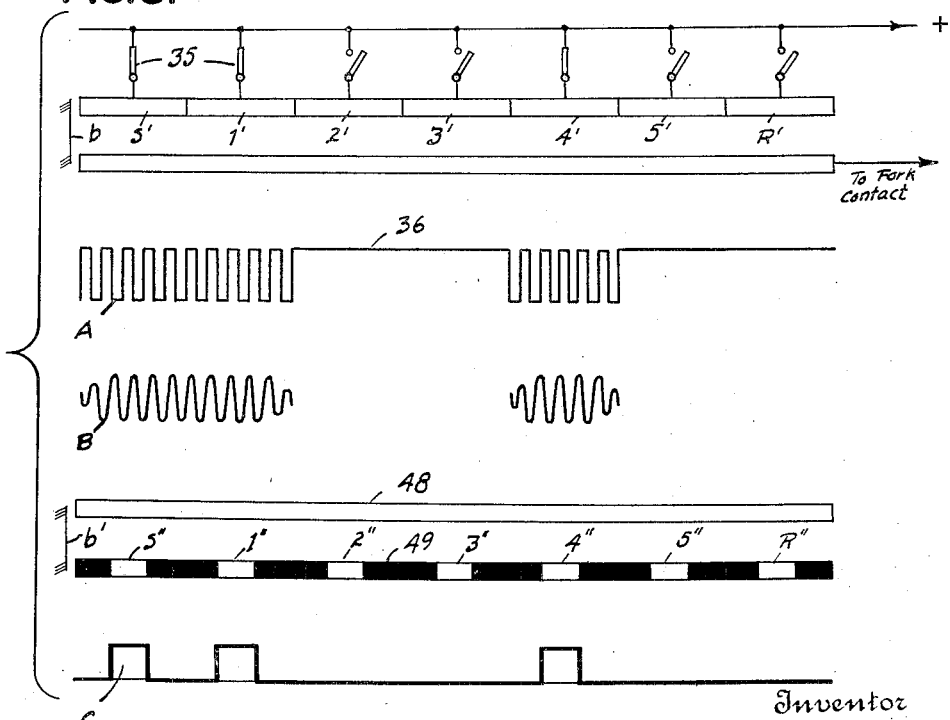
Inventor
HAKON H. HAGLUND
By his Attorney
Eugene E. Brown Patented Oct. 18, 1932

1,882,817

UNITED STATES PATENT OFFICE

HAKON H. HAGLUND, OF FLUSHING, NEW YORK, ASSIGNOR TO THE WESTERN UNION TELEGRAPH COMPANY, OF NEW YORK, N. Y., A CORPORATION OF NEW YORK

TELEGRAPH CARRIER SYSTEM

Application filed June 26, 1930. Serial No. 464,638.

This invention relates to telegraph transmitting, repeating and receiving apparatus and more particularly to a telegraph carrier current system in which code signals are transmitted in the form of groups or trains of current alternations of predetermined frequency.

The invention is applicable to land line transmission over a wide range of frequencies but is particularly suitable to relatively low frequency, high current systems such as are required in submarine cable systems.

For instance, in certain trans-atlantic submarine cable telegraph lines, a number of relatively low speed long span cables extend between Newfoundland and Ireland and are connected at each end to other cable sections extending between Nova Scotia and Newfoundland and between England and Ireland respectively. The system is extended by land lines from the cable stations in Nova Scotia and England. The long cable sections now in use between Newfoundland and Ireland are of the unloaded type and transmission thereover is restricted to a dot frequency of from five to seven and a half cycles per second. In order to permit through transmission the signal speed on the short end sections is necessarily restricted to the operating speed of the longer unloaded sections. However, the loaded end sections are capable of operation at frequencies up to one hundred cycles or more. Therefore, in order to reduce the number of short sections required and provide spare channels in case of failure of one of the short connecting sections, it has been proposed to provide a carrier channel in each direction over the loaded sections in addition to the regular duplex channels. The current required for carrier operation over the short cable sections is relatively high, however, of the magnitude of 0.5 amperes and is not readily obtained through the use of vacuum tube amplifiers.

Heretofore it has been the practice to apply the output of an alternator of the carrier frequency directly to the cable and to control the output thereof by controlling the field of the generator.

One of the objects of the present invention is to provide a telegraph carrier current system in which the power output to the line may be large and which may be controlled by a keying circuit employing a relatively low current.

A further object is to provide a carrier current transmitting system in which the shape of the output wave can be largely controlled by a filter circuit and in which, if the signal is distorted, it may be at least partially restored in shape by the repeating apparatus.

A further object is to provide a receiving means for a carrier current system in which the received signals will be completely regenerated so that the printing apparatus will receive a substantially perfect signal.

A still further object is to provide a receiving apparatus for a carrier current multiplex system in which the groups of oscillations serve as marking signals for certain channel printers and as spacing signals for other channel printers.

A still further object is to provide a telegraph carrier current transmitting system which is simple and inexpensive.

Other objects and advantages of the invention will hereinafter appear.

In accordance with my invention I employ any suitable type of oscillator, such as a tuning fork or vacuum tube oscillator having an output of small amplitude to control the discharge through gaseous conduction tubes of a type which are capable of passing a relatively large amount of current. The invention is largely dependent upon the characteristics of the gaseous discharge tube whereby the tube normally interposes a high resistance in the circuit in which it is connected but in which this resistance may be broken down by a relatively small current in the auxiliary or control circuit, the tube when its internal resistance is broken down being capable of passing a large amount of current.

A type of tube which I have found particularly satisfactory for this purpose is the so-called thyratron tube described in an article by Dr. Albert W. Hull, entitled, "Hot cathode thyratrons" and published in the General Electric Review, vol. 32, #4, of April 1929, at page 213. This type of tube is in effect an electrostatically controlled arc rectifier and briefly consists of a gas filled envelope containing an electron emitting cathode, a surrounding grid and an anode, the geometry of the tube, nature and pressure of the gas and electron emissivity of the cathode being such that with the proper positive potential applied to the anode, the grid, if negative, will interpose a high starting resistance to the tube but if the grid is rendered positive by a feeble current, the tube will break down and due to the arc discharge then occurring, will allow a large amount of current to flow from the anode to the cathode.

The tube is unlike the ordinary three electrode vacuum tube or audion in that as soon as the plate current starts, the grid has no further influence on the plate current and the discharge can only be stopped by removing or reducing the plate voltage.

This effect is attributed to the formation of a sheath of positive ions around the grid, usually only a fraction of a millimeter in thickness, which contains the entire voltage drop between the grid and the surrounding space. Varying the potential of the grid merely changes the thickness of this sheath without affecting the potential of the remaining space. The action of the grid may, therefore, be likened to a trigger since it is effective to initiate the discharge, but thereafter has no further influence on the discharge, the nature of the electrode being thus distinguished from the usual audion grid, which exerts a continuous influence on the discharge through the tube.

I employ two of such devices arranged to operate as an inverter having their input circuits coupled to the output circuit of the oscillator in such a manner that the gaseous conduction devices operate alternately during each cycle of the oscillator output. The output of the gaseous conduction devices is applied to an output transformer, the secondary winding of which is connected to a line circuit through a filter, which serves to shape the output wave.

A repeater may be employed at an intermediate station, the signals being applied directly or through a vacuum tube amplifier to the grid circuit of a second thyratron inverter, the output wave of which is again shaped by a suitable filter circuit.

At the receiving station the signals are applied to the grid of a single thyratron tube having a rotary distributor connected in the output circuit whereby, as the distributor brush rotates in synchronism with the transmitted signals, the output circuit of the tube will be interrupted between each signal and the signal will be regenerated so that substantially perfect signals are supplied to the receiving printer.

The system may be either start-stop or multiplex and in the latter case the printer circuit may be arranged so that the printers associated with each alternate channel will operate on the received oscillations as marking signals and those associated with the intermediate channels will operate on the received oscillations as spacing signals.

In order that the invention may be more fully understood reference will be had to the accompanying drawings in which:

Figure 1 is a circuit diagram showing the carrier current transmitting system embodying my invention;

Figure 2 is a circuit diagram of a repeating system embodying the invention;

Figure 3 is a circuit diagram illustrating a receiving system employing a start-stop printer;

Figure 4 shows diagrammatically a receiving system employing multiplex printers; and Figure 5 is a schematic view illustrating the form of the inverter output waves, the transmitted signals and the regenerated signals supplied to the printing mechanism.

The transmitting apparatus shown in Figure 1 comprises a suitable keying device 10 which may be a manually controlled transmitter of the start-stop type, or a tape controlled transmitter such as is described in a copending application of S. W. Rothermel, Serial No. 390,726, filed September 6, 1929, now Patent No. 1,805,374, granted May 12, 1931, and entitled "Distributor-transmitter for simplex telegraph systems." This keying device is diagrammatically illustrated as comprising a plurality of stationary contacts 11 connected to a common source of positive potential 12 and a group of movable contacts comprising a start contact S, code contacts 1 to 5, and a rest or stop contact R. The contacts S, 1 to 5, and R are connected to a contact arm 13 carried by one tine of a tuning fork 14 adapted to vibrate at a predetermined frequency. The arm 13 automatically engages contacts 15 and 16 which are connected respectively to the opposite ends of the primary winding 17 of a transformer 18, the midpoint of the winding 17 being connected to a source of negative potential. The fork is maintained in operation by a fork magnet 19 controlled through a fork contact 20 in the usual manner.

In transmitting a single character code combination, the transmitter contacts S, 1 to 5 and R are operated in succession, contacts 1 to 5 closing in different combinations in accordance with the usual arrangement of the Baudot code. Upon closing of one of the contacts, as the start contact S, current reversals occur in the winding 17 of a frequency equal to that of the fork 14. During the period of a spacing signal when none of the transmitter contacts are closed, the circuit to the primary winding 17 is open.

The current reversals produced in the windings of the transformer 18 may be of very low amplitude and therefore readily controlled at the transmitter and fork contacts. In order to increase the output of the oscillator, I employ an inverter comprising two gaseous conduction tubes 21 and 22 which may be of the thyratron type or having similar characteristics thereto, each tube having a positive electrode or anode 23, an electron emitting cathode 24, either of the directly or indirectly heated type, and a grid 25, enclosed within a gas filled envelope. The input and output circuit of the tubes 21 and 22 are arranged so that upon the application of a positive charge to the grid of one of the tubes, a discharge is initiated therethrough, which causes the discharge to cease in the other tube. Thus by alternately applying a positive charge to the grids of the two tubes, they may be caused to operate alternately. The cathodes 24 of the two tubes are connected together and to the negative terminal of a battery or other source of potential 26. The anodes 23 are connected through resistances R1 and R2 to the opposite terminals of the primary winding 27 of an output transformer 28 and are directly bridged by a condenser 29. The midpoint of the winding 27 is connected to the positive terminal of the battery 26. The grids 25 of the gaseous discharge tubes are connected to the opposite terminals of the secondary winding 30 of the transformer 18, the midpoint of which is joined through a stabilizing battery 31 to the cathodes of the tubes. The secondary winding 32 of the output transformer is connected to the outgoing line circuit L through a suitable wave shaping filter 33.

The operation of the inverter is as follows:
With the contact S of the transmitter closed, to produce current reversals in the winding of the transformer 18, the grids of the tubes 21 and 22 are alternately rendered positive. Assuming that on the first half cycle the grid of tube 21 is made positive, the internal resistance of this tube will be decreased and a discharge initiated therethrough, the current flowing from the positive terminal of the battery 26 through the upper half of the winding 27 of the output transformer and resistance R1 to the anode of tube 21, and thence from the cathode thereof back to the battery 26. A current is thus induced in the line circuit L, through the filter 33, in a definite direction. The tube 21 continues to operate as long as positive potential is applied to the anode thereof, independently of the grid 25 and until the beginning of the next current reversal through the transformer 18, at which time the positive charge is removed from the grid of tube 21 and a similar positive charge applied to the grid of tube 22. Tube 22 therefore starts to operate, permitting current to flow from the positive terminal of the battery 26 through the lower half of the winding 27 of transformer 28 in the opposite direction. The condenser 29 which was previously charged from the tube 21, is now subject to a displacement current in the opposite direction and therefore discharges in such a direction as to momentarily reduce the voltage in the plate circuit of the tube 21 sufficiently to permit the tube to become deionized. The tube 22 continues to operate, inducing a current in the line circuit L in the reverse direction from that induced due to the operation of the tube 21. Alternations are thus sent over the line circuit L at the same frequency as that of the oscillating fork.

If the first intelligence signal, controlled through contact 1 of the transmitter, is of marking character, a second train of oscillations will be transmitted over the line circuit L, the number of reversals or cycles comprising the marking signal depending, of course, upon the frequency and the length of time the contacts of the transmitter remain closed.

Assuming the second intelligence signal to be spacing, the transmitter contact 2 will remain open and the grids of both tubes 21 and 22 will remain negative under the influence of the stabilizing battery 31. The particular tube operating at the end of the preceding marking signal will continue to operate during the spacing period, but since the discharge is of a continuous nature, no current will be induced in the line circuit L. Therefore, each marking signal is transmitted over the line circuit as a train of oscillations and the spacing signals as no current intervals.

The oscillations at the terminals of the transformer 28 are of a regular form and may be readily shaped as desired and damped to reduce interference therefrom, by the wave filter 33.

Referring next to Figure 5 I have shown the transmitter diagrammatically as comprising a rotary distributor having a start segment S', five code segments, 1' to 5', and a rest segment R'. The brush b in passing over the segments, sets up different combinations of positive batery on the contact arm 13 of the fork, depending upon the position of the switch arms 35 which may represent the contacts of a tape transmitter such as that disclosed in patent to Benjamin, No. 1,298,440, granted March 25, 1919. The oscillations obtained at the terminals of the tubes 21 and 22 are substantially square topped as indicated at A, the spacing signals being represented by direct current portions 36. The crests of the waves will be rounded and the direct current portions 36 eliminated by the output transformer 28, and the waves may be further shaped and damped by the filter 33 so that the transmitted oscillations may appear in the form indicated at B.

If the transmisison line is unduly long, one or more repeaters may be employed of the type shown in Figure 2 and including a receiving transformer 40, having its secondary winding connected in the input circuit of a vacuum tube amplifier, indicated generally at 41, and comprising a three element vacuum tube 42 and a transformer 43. The grid and the cathode of the tube 42 are connected across the terminals of the secondary winding of the transformer 40, and the anode and cathode of the tube are connected across the primary winding of the transformer 43 through a suitable battery or other source of potential 44. The terminals of the secondary winding of the transformer 43 are connected to the grids of the two tubes of an inverter 45 of the same form as that employed in the transmitting apparatus. The output of the inverter is applied to the line L' through the output transformer 28' and wave filter 33'. Obviously, if the transmitted signals are not attenuated to too great an extent, the vacuum tube amplifier 41 may be omitted and the received signals employed directly through the transformer 40 to control the inverter 45. The inverter 45, transformer 28' and wave filter 33' may reform the waves and retransmit them in substantially their original shape.

One form of receiving apparatus is shown in Figure 3 and comprises the receiving transformer 40', vacuum tube amplifier 41', a single gaseous conduction tube 46, and a rotary distributor 47 having a solid ring 48 and a segmented ring 49, the latter ring comprising a rest segment R'', a start segment S'', and five code segments, 1'' to 5'', each of these segments being separated by a dead segment. The grid and cathode of the tube 46 are connected across the terminals of the secondary winding of the transformer 43' through the usual stabilizing battery 31'. The anode 23' of the tube is joined to the solid ring 48 of the distributor, and the cathode 24' is connected through the battery 50 to one terminal of the winding 51 of the start magnet and windings 52 to 56 of the selecting magnets of the printing telegraph mechanism, the opposite terminals of these windings being connected to the contacts S'' and 1'' to 5'' respectively of the rotary distributor. The brush b' passes across the segments in substantial synchronism with the transmitted groups of oscillations.

With the brush b' resting on the start segment S'', upon the receipt of the first half cycle of the start signal train of oscillations, the tube 46 will start to operate, the circuit being completed from the anode 23' through the brush b', segment S'' and start magnet 51 to the battery 50. The brush b' is thus released so as to make one revolution across the face of the distributor. As the brush passes on to the dead segment following segment S'', the plate circuit of the tube 46 is interrupted and the discharge through the tube ceases. As the brush passes on to segment 1'', if a marking signal is being received over the line circuit, the discharge again starts through the tube 46 to operate the selecting magnet 52. However, if a spacing signal or no current interval occurs at this time, tube 46 remains unoperated and the magnet 52 unenergized. The discharge through the tube 46 is caused to cease after each signal, and prior to the receipt of the succeeding signal train, by interrupting the plate circuit through the intermediate dead segments of the distributor.

Referring again to Figure 5, the rings 48 and 49 of the receiving rotary distributor are shown, the brush b' sweeping over the ring in synchronism with the received signals B. The live segments S'', 1'' to 5'' and R'' are of such width as to correspond to the central portion only of each train of received oscillations, to insure the received signals being of sufficient strength to initiate the discharge through the tube 46 and produce perfect signals for the printer magnets, of the form shown at C.

In Figure 4 I have illustrated a modified receiving arrangement for two channel multiplex operation in which the received oscillations serve as marking signals for the first or A channel printer and as spacing signals for the second or B channel printer. The distributor 50 has a solid ring 51 and two segmented rings 52 and 53. The selecting magnets 54 of the A channel printer are connected to the segments 1a, 2a, 3a, 4a, and 5a of ring 53 and to the battery 55 so as to operate in response to the received oscillations in the same manner as described with reference to Figure 3. The selecting magnets 56 of the B channel printer are similarly connected to segments 1b to 5b of ring 53, the opposite terminals being connected to an intermediate point D of a potentiometer 57, such that the voltage drop through the portion 58 of the potentiometer is substantially equal to the voltage drop through the tube 46' when the tube is operating, whereby when a group of oscillations is received, during passage of the brush b'' across the B channel segments, the potential of the point D will be the same as that of the solid ring 51 and no current will flow therebetween through the printer magnets 56. The segments 1'b to 5'b of ring 52 are strapped together and connected to the positive terminal of the battery 55 through an inductance 59, which balances the inductance of one of the printer magnets and a resistance 60 substantially equal to the portion 61 of the potentiometer 57.

During the passage of the brush b'' over segments 1a to 5a, the tube 46' operates in response to each received group of oscillations, the circuit being completed directly through the ring 51 and segments 1a to 5a to the printer magnets 54 and thence to the positive terminal of the battery 55. During passage of the brush over segments 1b to 5b, if no oscillations are received current flows from the positive terminal of the battery through the resistance 60 and inductance 59 across the segments of rings 52 and 53 and through the printer magnets 56 and resistance 58 to the negative terminal of the battery. If a group of oscillations are received during the passage of the brush over one of the B channel segments, as segment 2b, the tube 46' operates, producing a shunt path from the segment 2'b and solid ring 51 to the negative terminal of the battery, thus reducing the current through the printer magnets to such an extent that the magnet does not respond. The received oscillations therefore serve as spacing signals for the B channel printer.

Inasmuch as the gaseous conduction tubes of the thyratron type of moderate size are capable of passing large currents, of several amperes, under the control of extremely feeble currents, the present system is particularly adaptable for carrier current telegraph systems requiring the transmission of signals of large amplitude.

It is obvious of course that other forms of inverters may be employed and various changes made in the construction and arrangement of the transmitting and receiving apparatus without departing from the spirit or essential attributes of the invention and therefore I do not desire to be limited to the exact details shown and described, except as required by the appended claims.

What I claim is:

1. A carrier current telegraph system comprising a source of oscillations, a keying device therefor, and means responsive to said oscillations for applying oscillations of the same frequency and increased amplitude to a line circuit, comprising an electrostatically controlled arc discharge tube for each polarity of current.

2. A carrier current telegraph system comprising a source of oscillations, a keying device therefor for producing groups of oscillations in accordance with a telegraph code, an electrostatically controlled arc discharge path for each polarity of current, an input circuit for each of said paths, means for initiating a discharge through one of said paths each alternate half cycle of said oscillations, means for initiating a discharge through the other path each remaining half cycle, and means for interrupting the discharge through one of said paths upon starting of the discharge through the other path, an output circuit including each of said paths and a line circuit inductively coupled to each of said output circuits.

3. A carrier current telegraph system comprising a source of oscillations, a keying device therefor, an electrostatically controlled arc discharge path for each polarity of current, a line circuit and means for alternately applying the output from said paths to said line circuit in opposite directions in accordance with the frequency of said source of oscillations.

4. A carrier current telegraph system comprising a source of oscillations, a keying device therefor, an electrostatically controlled arc discharge tube, a line circuit and means for intermittently applying the output from said tube to said line circuit in accordance with the frequency of said source of oscillations.

5. A carrier current telegraph system comprising an arc discharge path for each polarity of current, an input circuit for each of said paths, means in said input circuit for starting and stopping the current flow through said paths alternately, a keying device for interrupting said input circuit, an output circuit for each path and a line circuit oppositely coupled to each of said output circuits whereby oscillating currents are applied thereto.

6. A carrier current telegraph system comprising a source of oscillations, a gaseous discharge path for controlling each polarity of current, an input circuit for each path, means for oppositely coupling said input circuits to said source of oscillation whereby current flows through said paths alternately at each current reversal, means for interrupting the current flow in one discharge path when the current flow starts in the other, an output circuit for each of said paths and a line circuit oppositely coupled to said output circuits whereby oscillating currents are applied thereto.

7. A carrier current telegraph system comprising a source of oscillations, a keying device therefor, and means responsive to said oscillations for applying oscillations of the same frequency and increased amplitude to a line circuit, comprising an electrostatically controlled arc discharge path for each polarity of current.

8. A carrier current telegraph system comprising electric valve means having a plurality of gaseous electric discharge paths, a transmission circuit, said discharge paths being included in circuits oppositely coupled to said transmission circuit, control means for periodically shifting the discharge from one of said paths to the other at a rapid rate and means for operating said control means in accordance with telegraph code signals.

9. A carrier current telegraph system comprising electric valve means having a plurality of gaseous electric discharge paths, a transmission circuit, said discharge paths being included in circuits oppositely coupled to said transmission circuit, means including a control circuit for periodically shifting the discharge from one of said paths to the other at a rapid rate and means for opening and closing said control circuit in accordance with telegraph code signals.

10. A carrier current telegraph system comprising electric valve means having a plurality of gaseous electric discharge paths, a transmission circuit, said discharge paths being included in circuits oppositely coupled to said transmission circuit, a control electrode for each discharge path for starting a current flow therein, means for interrupting the current flow in one path upon starting current flow in the other and a vibrating element connected between said control electrode for causing current flow to be started in said paths alternately.

11. A carrier current telegraph system comprising electric valve means having a plurality of gaseous electric discharge paths, a transmission circuit, said discharge paths being included in circuits oppositely coupled to said transmission circuit, a control electrode for each discharge path for starting a current flow therein, means for interrupting the current flow in one path upon starting current flow in the other, and a circuit interrupter connected between said control electrodes for causing current flow to be started in said paths alternately and periodically.

12. A carrier current telegraph system comprising electric valve means having a gaseous electric discharge path, a transmission circuit coupled to said discharge path, means for periodically creating and interrupting current flow in said discharge path for producing oscillations in said transmission circuit and means for actuating said control means in accordance with telegraph code signals.

13. A carrier current telegraph system comprising electric valve means having a gaseous electric discharge path, a transmission circuit coupled to said discharge path, means for periodically creating and interrupting current flow in said discharge path for producing oscillations in said transmission circuit, and a telegraph transmitter associated with said control means for interrupting said oscillations in accordance with telegraph code signals.

14. A carrier current telegraph system comprising electric valve means having a gaseous electric discharge path, a transmission circuit coupled to said discharge path, control means including a circuit interrupting device for periodically creating an interrupting current flow in said discharge path for producing oscillations in the transmission circuit and a telegraph transmitter in circuit with said circuit interrupting device for modifying said oscillations in accordance with telegraph code signals.

15. In a telegraph system, a continuous vibrating fork, an electrostatically controlled arc discharge tube and means including said fork for periodically starting and interrupting a discharge through said tube.

In testimony whereof I affix my signature.

HAKON H. HAGLUND.